(12) United States Patent
Fujioka et al.

(10) Patent No.: US 7,247,198 B2
(45) Date of Patent: Jul. 24, 2007

(54) WATER BASE FOR INK-JET RECORDING AND INK-JET RECORDING METHOD

(75) Inventors: Masaya Fujioka, Nagoya (JP); Akihiko Taniguchi, Nagoya (JP); Shunichi Higashiyama, Yotsukaichi (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 0 days.

(21) Appl. No.: 10/391,694

(22) Filed: Mar. 19, 2003

(65) Prior Publication Data

US 2003/0177940 A1  Sep. 25, 2003

(30) Foreign Application Priority Data

Mar. 20, 2002 (JP) .............................. 2002-079315

(51) Int. Cl.
*C09D 11/02* (2006.01)
*G01D 11/00* (2006.01)

(52) U.S. Cl. .............. 106/31.6; 106/31.58; 106/31.86; 106/31.27; 347/100

(58) Field of Classification Search .............. 106/31.6, 106/31.9, 476, 31.58, 31.86, 31.27; 347/100
See application file for complete search history.

(56) References Cited

U.S. PATENT DOCUMENTS

| | | | | |
|---|---|---|---|---|
| 5,200,762 A | * | 4/1993 | Katano et al. | 347/221 |
| 5,335,001 A | * | 8/1994 | Katano | 347/183 |
| 5,653,901 A | * | 8/1997 | Yoshimura | 219/121.71 |
| 5,908,721 A | * | 6/1999 | Emoto et al. | 430/7 |
| 6,342,095 B1 | * | 1/2002 | Takizawa et al. | 106/31.27 |
| 6,503,307 B1 | * | 1/2003 | Noguchi | 106/31.27 |
| 6,557,991 B2 | * | 5/2003 | Koitabashi et al. | 347/101 |
| 6,586,495 B1 | * | 7/2003 | Shimomura et al. | 522/112 |
| 6,670,409 B2 | * | 12/2003 | Yatake | 523/160 |
| 2002/0101477 A1 | * | 8/2002 | Hiroyuki et al. | 347/45 |
| 2003/0170401 A1 | * | 9/2003 | Shimomura et al. | 427/496 |
| 2003/0185996 A1 | * | 10/2003 | Shimomura et al. | 427/510 |

FOREIGN PATENT DOCUMENTS

| | | |
|---|---|---|
| JP | 2-187342 | 7/1990 |
| JP | 04-173345 | 6/1992 |
| JP | 7-304176 | 11/1995 |
| JP | 9-193403 | 7/1997 |
| JP | 10-034941 | 2/1998 |
| JP | 11-268264 | 10/1999 |
| JP | 2000-127415 | 5/2000 |
| JP | 2001-281434 | 10/2001 |
| JP | 2001-302951 | 10/2001 |
| JP | 2003-182089 | 7/2003 |

* cited by examiner

*Primary Examiner*—J. A. Lorengo
*Assistant Examiner*—Veronica Faison-Gee
(74) *Attorney, Agent, or Firm*—Reed Smith LLP

(57) ABSTRACT

A water base ink for ink-jet recording to be used for an ink-jet recording apparatus having an ink-jet head comprises a self-dispersing type coloring agent, water, and a water-soluble organic solvent. The surface tension of the ink is 30 to 50 mN/M, the advancing contact angle with respect to the jetting surface of the ink-jet head is not less than 65°, the receding contact angle is not less than 55°, and the difference between the advancing contact angle and the receding contact angle is not more than 20°. It is possible to jet the ink stably, it is possible to form a sharp recorded image with less blur, and it is possible to obtain the recorded image excellent in water resistance.

17 Claims, 5 Drawing Sheets

WATER BASE FOR INK-JET RECORDING AND INK-JET RECORDING METHOD

BACKGROUND OF THE INVENTION

1. Field of the Invention

The present invention relates to a water base ink for ink-jet recording to be used for an ink-jet recording method in which the water base ink for ink-jet recording is allowed to fly as minute liquid droplets from a recording head having a large number of pore nozzles to form a recorded image, and an ink-jet recording apparatus which accommodates the same.

2. Related Art

In the ink-jet recording system, ink droplets are formed by using an ink-jetting method including, for example, the electrostatic attraction method, the method in which mechanical vibration or displacement is applied to the ink by using a piezoelectric element, and the method in which bubbles are generated by heating the ink to utilize the pressure generated thereby, and all or a part of the ink droplets are adhered to an objective recording material such as paper to perform the recording.

In relation to the ink for ink-jet recording to be used for the ink-jet recording system as described above, products of water base inks for ink-jet recording, which use water as the main solvent, have been hitherto vigorously developed. In particular, a water base ink for ink-jet recording, which uses a water-soluble dye as the coloring agent, has been used, because it is possible to obtain a high density recorded image with vivid color tone, no clog-up occurs in the ink flow passage or at the tip of the recording head of the ink-jet printer, and no discharge defect is caused because the water-soluble dye is completely dissolved in the ink solvent.

Recently, complex information composed of text letters and graphs or the like are printed in many situations in the office. In relation to the office use as described above, the recorded image is required to have the following characteristics which are regarded to be especially important. That is, the printing density is high. Letters and ruled lines are, for example, sharp and scarcely blurred. The water resistance is excellent.

In the case of the conventional water base ink for ink-jet recording which uses the water-soluble dye as the coloring agent, the water-soluble dye as the coloring agent is dissolved in the ink solvent. Therefore, the printing quality in relation to the blur or the like is approximately determined by the property of the ink solvent. It is difficult to obtain a printing quality in which the image is sharp and scarcely blurred. Further, the water resistance of the recorded image cannot be satisfactory, because the coloring agent is water-soluble.

On the other hand, a water base ink for ink-jet recording, which uses a pigment as the coloring agent, has been recently developed. Products are being vigorously developed, which utilize the characteristics of the pigment that is excellent, for example, in water resistance and light resistance. Further, a water base ink for ink-jet recording is also researched, which uses fine coloring resin particles colored with an oil-soluble dye or the like as an unique coloring agent which possesses both of the vivid color tone of the dye and the water resistance of the pigment.

In the water base inks for ink-jet recording based on the use of the particulate coloring agent such as the fine coloring resin particles and the pigment as the coloring agent, the coloring agent is not dissolved in the solvent, but the coloring agent is dispersed. Therefore, the printing quality is hardly affected by the blur of the ink solvent to advantageously obtain the printing quality in which the image is sharp and scarcely blurred, and the water resistance of the recorded image is also satisfactory, as compared with the case in which water-soluble dye is used as the coloring agent.

However, for example, the water base ink for ink-jet recording, which uses the particulate coloring agent such as a self-dispersing type coloring agent, involves such a problem that the particulate coloring agent is secured to the nozzle surface of the recording head. A problem has arisen such that it is extremely difficult to stably jet the ink from the recording head as compared with the case in which the water-soluble dye is used as the coloring agent.

SUMMARY OF THE INVENTION

The present invention has been made in order to solve the problems as described above, an object of which is to provide a water base ink for ink-jet recording which can be jetted stably, which makes it possible to form a sharp recorded image with less blur, and which makes it possible to obtain the recorded image excellent in water resistance, when the water base ink for ink-jet recording is used for an ink-jet recording method in which the water base ink for ink-jet recording is allowed to fly as minute liquid droplets from a recording head having a large number of pore nozzles to form the recorded image. Another object of the present invention is to provide an ink-jet recording apparatus accommodating the ink.

The water base ink for ink-jet recording of the present invention is used for the ink-jet recording method in which the water base ink for ink-jet recording is allowed to fly as minute liquid droplets from the recording head having a large number of pore nozzles to form the recorded image. As a result of vigorous investigations performed by the present inventors, it has been found out that the water base ink for ink-jet recording is prevented from being secured to the nozzle surface of the recording head and the jetting operation can be performed in a stable manner even with the water base ink for ink-jet recording containing a particulate coloring agent by allowing the contact angles of the water base ink for ink-jet recording with respect to the nozzle surface of the recording head to have certain values. Thus, the present invention has been completed.

According to a first aspect of the present invention, there is provided a water base ink for ink-jet recording comprising:

water; and a self-dispersing type coloring agent, wherein:

a surface tension of the ink is 30 to 50 mN/m; and an advancing contact angle is not less than 65°, a receding contact angle is not less than 55°, and a difference between the advancing contact angle and the receding contact angle is not more than 20° when a droplet of the ink is placed on a polyimide resin base plate on which an FEP resin film is formed.

According to a second aspect of the present invention, there is provided an ink-jet recording apparatus comprising:

an ink-jet head which has a surface on which a nozzle for jetting an ink is formed; and an ink tank which accommodates the ink, wherein:

the ink comprises water and a self-dispersing type coloring agent, and a surface tension of the ink is 30 to 50 mN/m; and an advancing contact angle is not less than 65°, a receding contact angle is not less than 55°, and a difference between the advancing contact angle and the receding contact angle is not more than 20° when a droplet of the ink is placed on the surface of the ink-jet head. The surface of the ink-jet head may be formed of a polyimide resin base plate on which an FEP resin film is formed. The ink tank may be either a replaceable ink cartridge or a tank which is attached and fixed to the recording apparatus. The recording apparatus may comprise a wiper which wipes the ink-jet head, and a purge unit which purges the ink-jet head.

BRIEF DESCRIPTION OF THE DRAWINGS

FIG. 3 schematically shows a method for measuring the advancing contact angle θa.

DESCRIPTION OF THE PREFERRED EMBODIMENTS

Figure 1:
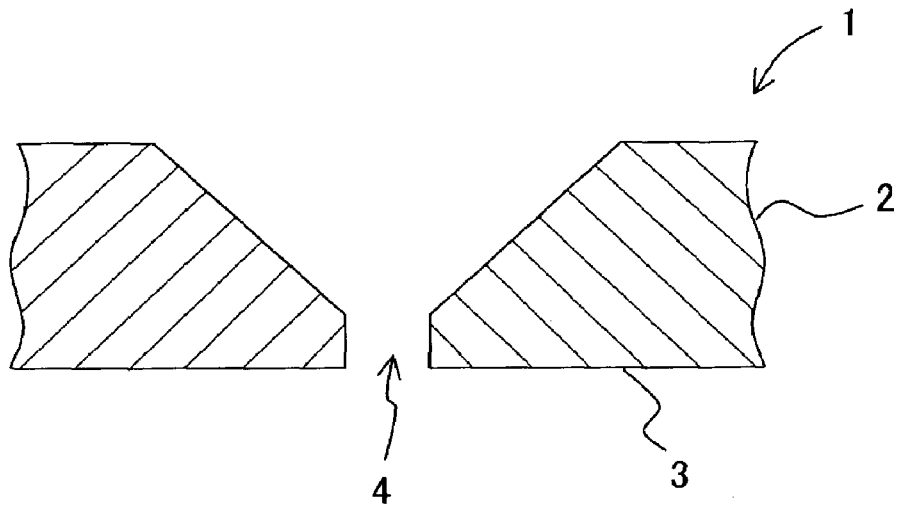
FIG. 1 shows a sectional view illustrating a nozzle plate.
Figure 2:
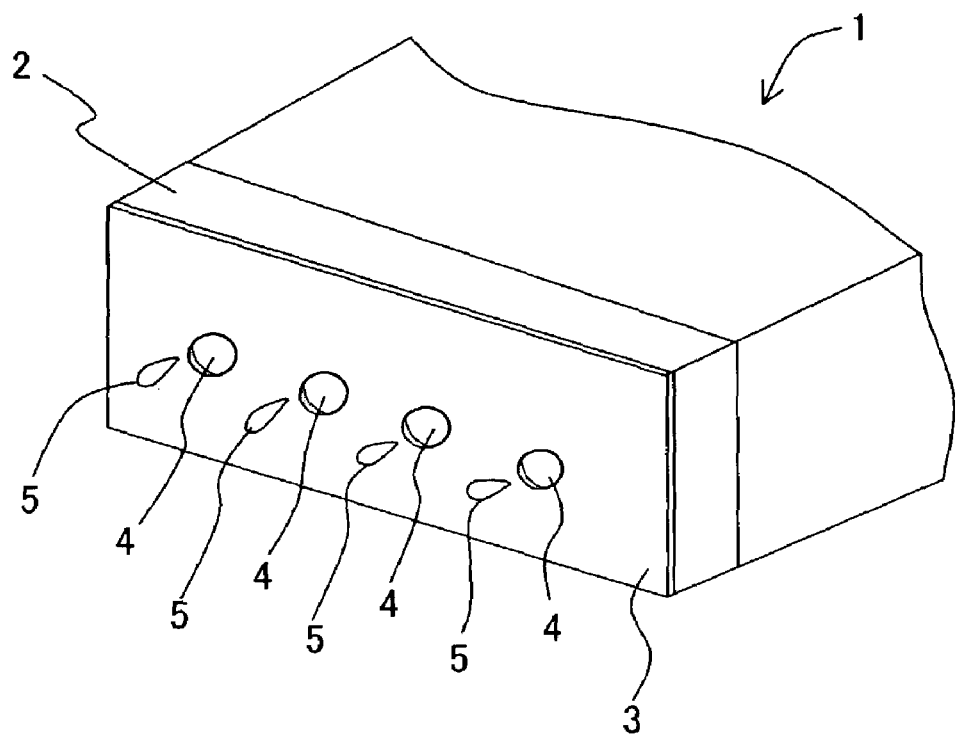
FIG. 2 shows a perspective view illustrating the nozzle plate.

The present invention will be explained in detail below with reference to the drawings. Those usable as the recording head of the ink-jet recording apparatus include those which have a large number of pore nozzles and which make it possible to allow the water base ink for ink-jet recording to fly as minute liquid droplets. In this specification, the nozzle surface of the recording head means the surface of the recording head on which the pore nozzles are provided, and the nozzle surface is constituted by a member called "nozzle plate" which constitute the recording head. A preferred example of the nozzle plate will be explained below with reference to FIGS. 1 and 2. FIG. 1 shows a sectional view illustrating the nozzle plate 1, and FIG. 2 shows a perspective view illustrating the nozzle plate 1.

The nozzle plate 1 has a large number of pore nozzles 4 which are formed in one array on a nozzle surface (jetting surface) 3 as one surface of a base plate 2 in order to jet the water base ink for ink-jet recording 5. Usually, a water-repellent film is formed on the nozzle surface 3.

The material for forming the base plate 2 is not specifically limited. The material is generally exemplified by those which have the solvent resistance to the solvent of the water base ink for ink-jet recording 5 and which have softening temperatures higher than that of the water-repellent film or which are not softened by the heat. Specifically, for example, a polyimide resin, which has no melting point and which has extremely excellent thermal characteristics, is preferably used. However, for example, a resin such as a thermosetting resin may be used.

The material for forming the water-repellent film is not specifically limited, which is selected depending on the solvent of the water base ink for ink-jet recording 5. There may be exemplified, for example, fluorine-based resins and silicon-based resins. The fluorine-based resin is not specifically limited, including, for example, tetrafluoroethylene-hexafluoropropylene copolymer resin (FEP resin), polytetrafluoroethylene resin (PTFE resin), tetrafluoroethylene-perfluoroalkoxyethylene copolymer resin (PFA resin), trifluoroethylene chloride resin (PCTFE resin), tetrafluoroethylene-ethylene copolymer resin (ETFE resin), vinylidene fluoride resin, and vinyl fluoride resin. In particular, the FEP resin, which has a softening point (melting point) of 250° C. to 280° C., is preferably used. The water-repellent film is applied, for example, to form a film having a thickness of about 1 μm on one surface of the base plate 2 so that the nozzle surface 3 is formed thereby.

The nozzle plate 1 can be manufactured, for example, by means of any one of methods disclosed in Japanese Patent Application Laid-open Nos. 2-187342, 9-193403, and 7-304176.

The advancing contact angle of the water base ink for ink-jet recording of the present invention with respect to the nozzle surface of the recording head is not less than 65°. When the advancing contact angle is not less than 65°, then those disposed in the vicinity of the nozzle are hardly wetted by the water base ink for ink-jet recording of the present invention, and the securing of the particulate coloring agent onto the nozzle surface is hardly caused. Therefore, it is easy to perform the jetting operation in a stable manner.

The receding contact angle of the water base ink for ink-jet recording of the present invention with respect to the nozzle surface of the recording head is not less than 55°. When the receding contact angle is not less than 55°, it is easy to repel the ink again even after the nozzle surface is once wetted by the water base ink for ink-jet recording of the present invention. It is easy to wipe out the water base ink for ink-jet recording of the present invention from the nozzle surface during the restoration operation to remove the ink with a rubber wiper or the like. The stable jetting operation is not inhibited thereby.

In the water base ink for ink-jet recording of the present invention, the difference between the advancing contact angle and the receding contact angle is not more than 20°. When the difference is not more than 20°, any wiping unevenness is hardly caused during the restoration operation in which the water base ink for ink-jet recording of the present invention, which is adhered to the nozzle surface, is removed with a rubber wiper or the like. It is easy to make the restoration to the normal jetting state.

Figure 3:
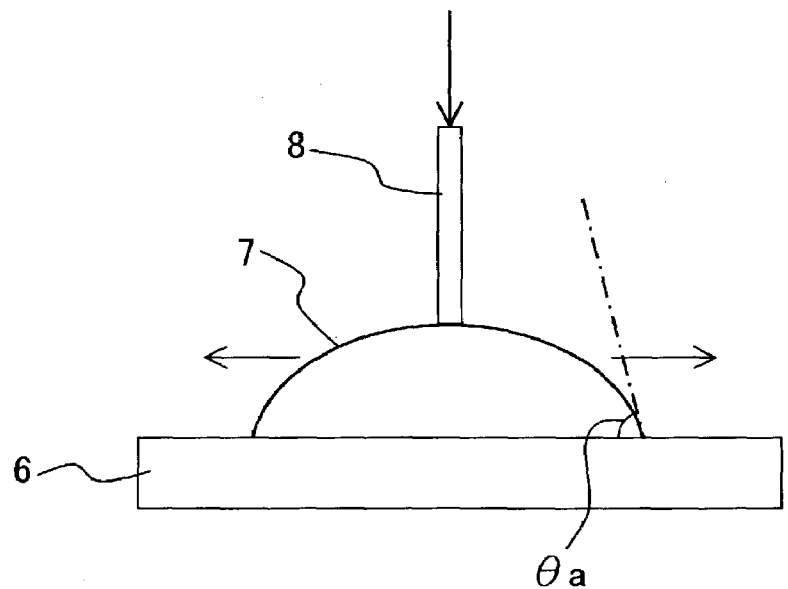
Figure 4:
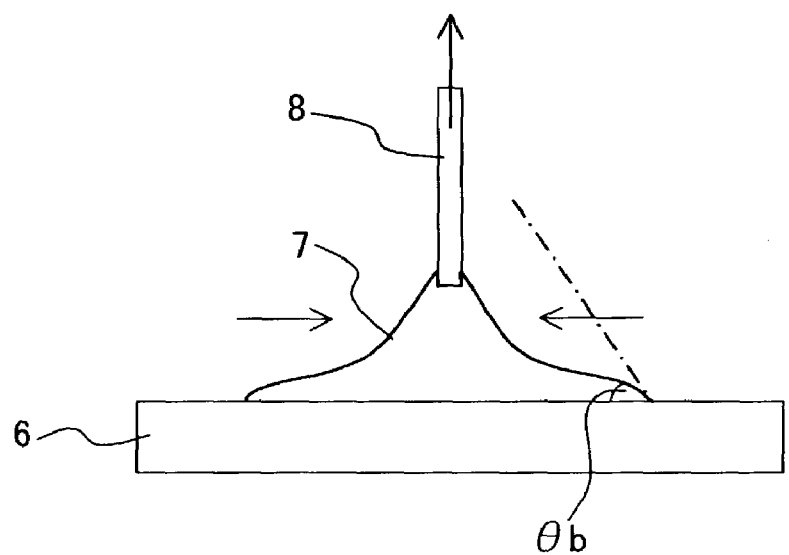
FIG. 4 schematically shows a method for measuring the receding contact angle θb.

The methods for measuring the advancing contact angle and the receding contact angle may include, for example, a method in which a certain amount of ink droplet is placed on a surface composed of the same material as that of the nozzle surface of the recording head to effect the expansion and the contraction as shown in FIGS. 3 and 4 by using, for example, Contact Angle Meter CA-X type produced by Kyowa Interface Science Co., Ltd. That is, as shown in FIG. 3, in the standard measuring method with the contact angle meter, the ink droplet 7 is placed on the surface 6 composed of the same material as that of the nozzle surface of the recording head, and the ink droplet 7 is expanded while pricking the ink droplet 7 with a syringe needle 8 to measure the contact angle. Further, as shown in FIG. 4, the ink droplet 7 is contracted to measure the contact angle. The contact angle θa of the ink droplet, which is obtained when the ink droplet is expanded, is the advancing contact angle. The contact angle θb of the ink droplet, which is obtained when the ink droplet is contracted, is the receding contact angle. The surface, which is composed of the same material as that of the nozzle surface of the recording head, is, for example, a solid surface on which a water-repellent film of FEP resin is formed as a film on a polyimide resin, when the nozzle surface of the recording head has the water-repellent film which is composed of the FEP resin and which is formed on the base plate composed of the polyimide resin. The water-repellent film of the FEP resin is formed to have a film thickness of 0.05 µm-0.6 µm, preferably 0.2 µm-0.5 µm.

When the ink is produced and/or sold as an exchangeable cartridge or a supplement bottle or a package, the contact angles θa, θb are measured by using the measuring surface of the polyimide resin base plate formed with the FEP resin film which has thickness of 0.2 µm-0.5 µm and placing the ink droplet thereon. When the ink is accommodated in a tank or a cartridge attached to an ink-jet recording apparatus such as an ink-jet printer and a facsimile, the contact angles θa, θb are measured by using the measuring surface of the nozzle surface of the recording head of the ink-jet recording apparatus and placing the ink droplet thereon or on the base plate having the same structure.

The surface tension of the water base ink for ink-jet recording of the present invention is 30 to 50 mN/m. If the surface tension is less than 30 mN/m, then the permeation into the recording paper is caused unnecessarily intensely, and it is impossible to obtain a sharp recorded image with less blur even when the particulate coloring agent such as a self-dispersing type coloring agent is used. If the surface tension exceeds 50 mN/m, bubbles tend to remain in the recording head. Therefore, the following problems arise. That is, for example, the performance of introduction of the ink into the recording head is deteriorated in some cases, the restoration to the normal jetting operation is hardly performed in other cases when any jetting defect occurs, and it is difficult to perform the stable jetting operation. Further, the ink is permeated into the recording paper extremely slowly. Therefore, the drying performance and the fixation performance of the recorded image are deteriorated. When the surface tension is 30 to 50 mN/m, bubbles hardly remain in the recording head. Therefore, the performance of introduction of the ink into the recording head is excellent. Even when any jetting defect occurs, it is easy to make the restoration to the normal jetting state by means of the restoration operation such as the suction purge. Further, the ink is permeated into the recording paper appropriately. Therefore, the drying performance and the fixation performance are satisfactory. It is possible to obtain a sharp recorded image with less blur as the superiority of the particulate coloring agent. The method for measuring the surface tension is not specifically limited, including, for example, a method for measuring the surface tension by using a surface tension meter such as Surface Tension Meter CBVP-Z type produced by Kyowa Interface Science Co., Ltd.

The water base ink for ink-jet recording of the present invention contains the self-dispersing type coloring agent. In this application, the self-dispersing type (particulate) coloring agent means the (particulate) coloring agent such as the pigment or the coloring resin particle(s) which has at least one functional group to add the dispersing property on the surface and which is thereby capable of being dispersed in water without requiring any dispersing agent.

The functional group to add the dispersing property includes, for example, carbonyl group, carboxyl group, hydroxyl group, and sulfone group. The functional group to add the dispersing property can be bonded to the particulate coloring agent by means of a surface treatment. The method for the surface treatment may include, for example, a method in which the oxidation is performed with a hypohalogen acid salt after applying the surface modification such as the plasma treatment or the oxidation with a general oxidizing agent to the particulate coloring agent, and a method in which a diazonium salt is subjected to a reducing reaction in an aqueous solution having pH=2 containing the particulate coloring agent and the diazonium salt.

The pigment, which is appropriate to apply the surface treatment thereto, is not specifically limited. However, those exemplified as carbon black may include, for example, MA8, MA100 (both produced by Mitsubishi Chemical Corporation), and Carbon Black FW200 (produced by Degussa). The yellow pigment, which is appropriate to apply the surface treatment thereto, may include, for example, C. I. Pigment Yellow 3, 13, 74, 83, 154. In particular, Pigment Yellow 74 may be exemplified, for example, by HANSA BRILL. YELLOW 5GXW (produced by Clariant). The red pigment, which is appropriate to apply the surface treatment thereto, may include, for example, C. I. Pigment Red 5, 48, 112, 122, 177, 202, 207. In particular, Pigment Red 122 may be exemplified, for example, by Fastogen Super Magenta R (produced by Dainippon Ink and Chemicals, Incorporated). The blue pigment, which is appropriate to apply the surface treatment thereto, may include, for example, C. I. Pigment Blue 15, 15:3, 15:4, 16, 60. In particular, Pigment Blue 15:3 may be exemplified, for example, by HELIOGEN BULED 7080 (produced by BASF).

Commercially available products, which have been subjected to the surface treatment, may be also used as the self-dispersing type particulate coloring agent. There may be exemplified, for example, CaboJet 200, CaboJet 300 (both produced by Cabot), and Bonjet CW1 (produced by Orient Chemical Industries, Ltd.).

The blending amount of the self-dispersing type particulate coloring agent is changed depending on the desired recording density and the desired coloration. However, in general, the blending amount is preferably 1 to 15% by weight and more preferably 1 to 10% by weight with respect to the total amount of the water base ink for ink-jet recording of the present invention.

It is unnecessary to use any dispersing agent because the water base ink for ink-jet recording of the present invention contains the self-dispersing type particulate coloring agent. In general, a high molecular weight compound having a relatively large molecular weight is used as the dispersing agent in many cases in order to stably disperse the particulate coloring agent such as the coloring resin particles or the pigment in the solvent. Such a compound facilitates the securing of the particulate coloring agent onto the nozzle surface of the recording head, resulting in a factor to disturb the stable jetting operation. On the contrary, in the case of the water base ink for ink-jet recording of the present invention, the securing of the particulate coloring agent is not caused on the nozzle surface of the recording head, which would be otherwise caused by the influence of the dispersing agent. Thus, it is easy to perform the stable jetting operation.

The water base ink for ink-jet recording of the present invention is not specifically limited provided that the water base ink for ink-jet recording contains the self-dispersing type particulate coloring agent and the water base ink for ink-jet recording has the characteristics as described above. In general, the water base ink for ink-jet recording of the present invention contains, for example, water and/or a water-soluble organic solvent. Further, if necessary, the water base ink for ink-jet recording of the present invention may contain conventionally known permeating agents, viscosity-adjusting agents, surface tension-adjusting agents, pH-adjusting agents, antiseptic/fungicidal agents, and other similar compounds.

The water is preferably deionized water (pure water). The blending amount of the water is preferably not less than 40% by weight with respect to the total amount of the water base ink for ink-jet recording of the present invention in order that the viscosity of the ink in the normal state is maintained to be a low viscosity at which the jetting operation can be normally performed.

The water-soluble organic solvent is preferably used in order to avoid the securing of the particulate coloring agent onto the nozzle surface of the recording head. The water-soluble organic solvent is not specifically limited, including, for example, polyalkylene glycols such as polyethylene glycol; alkylene glycols such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentanediol, and hexylene glycol; glycerol; and pyrrolidones such as 2-pyrrolidone and N-methyl-2-pyrrolidone. The water-soluble organic solvent as described above may be used singly. Alternatively, two or more of the water-soluble organic solvents as described above may be used in combination.

It is preferable that the blending amount of the water-soluble organic solvent is 5 to 40% by weight with respect to the total amount of the water base ink for ink-jet recording of the present invention. If the blending amount is less than 5% by weight, then the moistening function is insufficient, and problems such as the deposition and the dry-up may arise in some cases. If the blending amount exceeds 40% by weight, the viscosity of the water base ink for ink-jet recording of the present invention is unnecessarily increased. Problems may arise in some cases, for example, such that the jetting operation cannot be performed and the ink is dried on the recording paper extremely slowly. The blending amount is more preferably 7 to 40% by weight and much more preferably 10 to 30% by weight.

The permeating agent is not specifically limited. However, for example, polyvalent alcohol monoalkyl ether, polyvalent alcohol dialkyl ether, and surfactants are preferably used. Monovalent alcohol such as ethanol and isopropyl alcohol may be also used. The permeating agent has the effect to improve the quick drying performance on the paper surface by effectively accelerating the permeation velocity of the water base ink for ink-jet recording of the present invention into the recording paper.

When the water base ink for ink-jet recording of the present invention is applied to the ink-jet recording system of the type in which the ink is jetted in accordance with the action of the thermal energy, values of thermal physical properties including, for example, those of the specific heat, the coefficient of thermal expansion, and the coefficient of thermal conductivity may be adjusted.

In order that the surface tension, the advancing contact angle, and the receding contact angle of the water base ink for ink-jet recording of the present invention are adjusted to be within the ranges as described above, the types and the blending amounts of the components such as water, the self-dispersing type particulate coloring agent, the water-soluble organic solvent, and the surfactant to be added to the ink may be appropriately adjusted.

The water base ink for ink-jet recording of the present invention contains the self-dispersing type particulate coloring agent, wherein the surface tension and the advancing contact angle and the receding contact angle with respect to the nozzle surface of the recording head or the predetermined base plate surface are within the specified ranges. Accordingly, when the water base ink for ink-jet recording of the present invention is used for the ink-jet recording method in which the water base ink for ink-jet recording is allowed to fly as minute liquid droplets from the recording head having a large number of pore nozzles to perform the recording, then the ink can be jetted stably, it is possible to form the sharp recorded image with less blur, and it is possible to obtain the recorded image which is excellent in water resistance.

The ink-jet recording method, in which the water base ink for ink-jet recording of the present invention is allowed to fly as minute liquid droplets from the recording head having a large number of pore nozzles to perform the recording, is also one of the aspects of the present invention.

EXAMPLES

The present invention will be explained in further detail below as exemplified by Examples. However, the present invention is not limited to only Examples.

Example 1

The following materials were sufficiently agitated and mixed, followed by being filtrated through a membrane filter of 2.5 μm to obtain a water base ink for ink-jet recording 1.
CaboJet 300 (self-dispersing type carbon black dispersion, pigment concentration: 15% by weight, balance: pure water, produced by Cabot): 33.3% by weight;
Glycerol: 15% by weight;
Diethylene glycol: 5% by weight;
Triethylene glycol monobutyl ether: 4.5% by weight;
ETHOMEEN S/15 (alkylamine-based surfactant, produced by Lion Corporation): 0.2% by weight;
Pure water: 42% by weight.

The surface tension of the obtained water base ink for ink-jet recording 1, the advancing contact angle with respect to the solid surface having the water-repellent film composed of the FEP resin formed on the polyimide resin, and the receding contact angle with respect to the solid surface having the water-repellent film composed of the FEP resin formed on the polyimide resin were measured. As a result, the surface tension was 36.8 mN/m, the advancing contact angle was 75°, and the receding contact angle was 66°.

The following evaluation tests 1 to 4 were performed with the obtained water base ink for ink-jet recording 1 by using a recording apparatus having a multi-head of the on-demand type (jetting nozzle diameter: 40 μm, driving voltage: 30 V, frequency: 10 kHz, base plate of nozzle plate was made of polyimide resin, water-repellent film was made of FEP resin) for forming the recorded image by generating ink droplets by applying the pressure to the water base ink for ink-jet recording in the recording head by means of the vibration of a piezoelectric element.

Evaluation Test 1: Jetting Stability

The continuous jetting was performed for 24 hours in atmospheres of 5° C., 25° C., and 40° C. respectively. In the test based on the use of the water base ink for ink-jet recording 1, the high quality recording was successfully performed from beginning to end in any one of the temperature conditions.

Evaluation Test 2: Restoration Performance

The recording head was filled with the water base ink for ink-jet recording 1 after the recording head was used for the evaluation test 1 in which the continuous jetting was performed for 24 hours in the atmosphere of 25° C. The recording head filled with the water base ink for ink-jet recording 1 was left to stand for 2 months. After the operation of being left to stand, the ink was forcibly discharged with a purge unit and the nozzle surface was wiped out with a rubber wiper to confirm the jetting state thereafter. In the test based on the use of the water base ink for ink-jet recording 1, the normal jetting state was restored and the recording was successfully performed stably and uniformly.

Evaluation Test 3: Printing Quality

XEROX 4200 paper (produced by XEROX) was used as the recording paper to perform the printing of those including letters and ruled lines, and the portions of letters and ruled lines were visually observed. In the test based on the use of the water base ink for ink-jet recording 1, a sharp recorded image with less blur, which had an excellent printing quality, was successfully obtained.

Evaluation Test 4: Water Resistance

The recording paper after the printing, which was prepared in the evaluation test 3, was immersed in tap water. The immersed recording paper was pulled up after 5 minutes to confirm the water resistance. In the test based on the use of the water base ink for ink-jet recording 1, the letters and the ruled lines were not disturbed at all, and they retained the states almost unchanged as compared with those observed before the immersion in tap water.

Example 2

The following materials were sufficiently agitated and mixed, followed by being filtrated through a membrane filter of 2.5 µm to obtain a water base ink for ink-jet recording 2.

CaboJet 300 (self-dispersing type carbon black dispersion, pigment concentration: 15% by weight, balance: pure water, produced by Cabot): 33.3% by weight;
Polyethylene glycol (average molecular weight: 200): 25% by weight;
ETHOMEEN C/15 (alkylamine-based surfactant, produced by Lion Corporation): 0.2% by weight;
OLFINE E1010 (acetylene glycol-based surfactant, produced by Nissin Chemical Industry Co., Ltd.): 1% by weight;
Pure water: 40.5% by weight.

The surface tension of the obtained water base ink for ink-jet recording 2, the advancing contact angle with respect to the solid surface having the water-repellent film composed of the FEP resin formed on the polyimide resin, and the receding contact angle with respect to the solid surface having the water-repellent film composed of the FEP resin formed on the polyimide resin were measured in the same manner as in Example 1. As a result, the surface tension was 30.7 mN/m, the advancing contact angle was 69°, and the receding contact angle was 57°.

The evaluation tests 1 to 4 were carried out with the obtained water base ink for ink-jet recording 2 in the same manner as in Example 1. Excellent evaluation results were successfully obtained in the same manner as in Example 1 in any one of the evaluation tests.

Example 3

The following materials were sufficiently agitated and mixed, followed by being filtrated through a membrane filter of 2.5 µm to obtain a water base ink for ink-jet recording 3.

CaboJet 200 (self-dispersing type carbon black dispersion, pigment concentration: 20% by weight, balance: pure water, produced by Cabot): 25% by weight;
Glycerol: 20% by weight;
Diethylene glycol diethyl ether: 0.5% by weight;
Naloacty 100 (nonionic surfactant, produced by Lion Corporation): 0.1% by weight;
Pure water: 54.4% by weight.

The surface tension of the obtained water base ink for ink-jet recording 3, the advancing contact angle with respect to the solid surface having the water-repellent film composed of the FEP resin formed on the polyimide resin, and the receding contact angle with respect to the solid surface having the water-repellent film composed of the FEP resin formed on the polyimide resin were measured in the same manner as in Example 1. As a result, the surface tension was 46.0 mN/M, the advancing contact angle was 78°, and the receding contact angle was 61°.

The evaluation tests 1 to 4 were carried out with the obtained water base ink for ink-jet recording 3 in the same manner as in Example 1. Excellent evaluation results were successfully obtained in the same manner as in Example 1 in any one of the evaluation tests.

Comparative Example 1

The following materials were sufficiently agitated and mixed, followed by being filtrated through a membrane filter of 2.5 µm to obtain a water base ink for ink-jet recording 4.

CaboJet 300 (self-dispersing type carbon black dispersion, pigment concentration: 15% by weight, balance: pure water, produced by Cabot): 33.3% by weight;
Glycerol: 15% by weight;
Diethylene glycol: 5% by weight;
Triethylene glycol monobutyl ether: 1% by weight;
Pure water: 45.7% by weight.

The surface tension of the obtained water base ink for ink-jet recording 4, the advancing contact angle with respect to the solid surface having the water-repellent film composed of the FEP resin formed on the polyimide resin, and the receding contact angle with respect to the solid surface having the water-repellent film composed of the FEP resin formed on the polyimide resin were measured. As a result, the surface tension was 55.9 mN/m, the advancing contact angle was 105°, and the receding contact angle was 95°.

The evaluation test 1 was carried out with the obtained water base ink for ink-jet recording 4 in the same manner as in Example 1. Unstable jetting states, which were caused by the jetting bending and the discharge failure, were frequently observed under any one of the temperature conditions. Even when it was intended to make the restoration to the normal jetting state by means of the restoration operation such as the suction purge, it was impossible to sufficiently make the restoration. The evaluation tests 2 to 4 were not carried out, because the recording apparatus failed to satisfactorily perform the jetting and the printing.

Comparative Example 2

Carbon black MA-7 (produced by Mitsubishi Chemical Corporation) and pure water in an amount of 100-fold were agitated for 1 hour, filtrated three times, and dried. The obtained material was used to prepare the following composition, and a dispersing treatment was performed with a pearl mill (produced by Ashizawa) charged with zirconia as grinding media to obtain a dispersion liquid. Liquid-contact parts of the dispersing machine used for this process were those having been ceramic-processed. Subsequently, the dispersion liquid was applied to a centrifugal separator to remove coarse particles. After that, the dispersion liquid was sufficiently agitated and mixed, followed by being filtrated through a membrane filter of 2.5 µm to obtain a water base ink for ink-jet recording 5.

Carbon black MA-7 (produced by Mitsubishi Chemical Corporation): 5% by weight;
Styrene-maleic anhydride copolymer (average molecular weight: 10,000, acid value: 175): 3% by weight;
Polyethylene glycol (average molecular weight: 200): 20% by weight;
ETHOMEEN C/15 (alkylamine-based surfactant, produced by Lion Corporation): 0.2% by weight;
OLFINE E1010 (acetylene glycol-based surfactant, produced by Nissin Chemical Industry Co., Ltd.): 1% by weight;
Pure water: 70.8% by weight.

The styrene-maleic anhydride copolymer described above is a water-soluble high molecular weight compound which is generally used as a dispersing agent for the pigment. The molecular weight of the styrene-maleic anhydride copolymer described above is equal to the weight average molecular weight. The molecular weight of polyethylene glycol is a molecular weight which is calculated on the basis of the hydroxyl group value (OHV) measured by the pyridine-phthalic anhydride method.

The surface tension of the obtained water base ink for ink-jet recording 5, the advancing contact angle with respect to the solid surface having the water-repellent film composed of the FEP resin formed on the polyimide resin, and the receding contact angle with respect to the solid surface having the water-repellent film composed of the FEP resin formed on the polyimide resin were measured. As a result, the surface tension was 31.5 mN/m, the advancing contact angle was 72°, and the receding contact angle was 49°.

The evaluation test 1 was carried out with the obtained water base ink for ink-jet recording 5 in the same manner as in Example 1. The bending and the discharge failure were observed after the passage of several hours in the test performed at 40° C. It was difficult to make the restoration to the normal jetting state by carrying out the restoration operation such as the suction purge and the wiping with the rubber wiper. The evaluation test 2 was carried out with the obtained water base ink for ink-jet recording 5 in the same manner as in Example 1. Adhered matters, which were considered to be dried-up matters of the water base ink for ink-jet recording, were observed on the nozzle surface. It was impossible to make the restoration to the normal jetting state due to the influence of the adhered matters even when the restoration operation was performed. The evaluation test 3 was carried out with the obtained water base ink for ink-jet recording 5 in the same manner as in Example 1. Nonuniform blur was slightly observed, and it was impossible to obtain any recorded image having a sufficiently satisfactory printing quality. The evaluation test 4 was carried out with the obtained water base ink for ink-jet recording 5 in the same manner as in Example 1. The letters and the ruled lines were not disturbed at all, and they retained the states almost unchanged as compared with those observed before the immersion in tap water in the same manner as in Example 1.

Comparative Example 3

The following materials were sufficiently agitated and mixed, followed by being filtrated through a membrane filter of 2.5 μm to obtain a water base ink for ink-jet recording 6.
CaboJet 300 (self-dispersing type carbon black dispersion, pigment concentration: 15% by weight, balance: pure water, produced by Cabot): 33.3% by weight;
Polyethylene glycol (average molecular weight: 200): 25% by weight;
Sodium dialkyl sulfosuccinate (PELEX OT-P, produced by Kao Corporation): 0.2% by weight;
OLFINE E1010 (acetylene glycol-based surfactant, produced by Nissin Chemical Industry Co., Ltd.): 1% by weight;
Pure water: 40.5% by weight.

The surface tension of the obtained water base ink for ink-jet recording 6, the advancing contact angle with respect to the solid surface having the water-repellent film composed of the FEP resin formed on the polyimide resin, and the receding contact angle with respect to the solid surface having the water-repellent film composed of the FEP resin formed on the polyimide resin were measured. As a result, the surface tension was 26.3 mN/m, the advancing contact angle was 56°, and the receding contact angle was 39°.

The evaluation test 1 was carried out with the obtained water base ink for ink-jet recording 6 in the same manner as in Example 1. The bending and the discharge failure were caused while the frequency was small and the jetting states were sometimes unstable especially in the test performed at 40° C. However, it was possible to make the restoration to the normal jetting state by carrying out the restoration operation such as the wiping. The evaluation test 2 was carried out with the obtained water base ink for ink-jet recording 6 in the same manner as in Example 1. It was possible to make the restoration substantially to the normal jetting state. The evaluation test 3 was carried out with the obtained water base ink for ink-jet recording 6 in the same manner as in Example 1. Nonuniform blur was conspicuous and the printing quality was not satisfactory. The evaluation test 4 was carried out with the obtained water base ink for ink-jet recording 6 in the same manner as in Example 1. The letters and the ruled lines were not disturbed at all, and they retained the states almost unchanged as compared with those observed before the immersion in tap water.

Comparative Example 4

The following materials were sufficiently agitated and mixed, followed by being filtrated through a membrane filter of 2.5 μm to obtain a water base ink for ink-jet recording 7.
Color Index Number Direct Black 168 (black pigment): 5% by weight;
Glycerol: 15% by weight;
Diethylene glycol: 5% by weight;
Triethylene glycol monobutyl ether: 4.5% by weight;
Pure water: 70.5% by weight.

The surface tension of the obtained water base ink for ink-jet recording 7, the advancing contact angle with respect to the solid surface having the water-repellent film composed of the FEP resin formed on the polyimide resin, and the receding contact angle with respect to the solid surface having the water-repellent film composed of the FEP resin formed on the polyimide resin were measured. As a result, the surface tension was 37.5 mN/m, the advancing contact angle was 73°, and the receding contact angle was 61°. The evaluation tests 1 and 2 were carried out with the obtained water base ink for ink-jet recording 7 in the same manner as in Example 1. Satisfactory results equivalent to those obtained in Example 1 were successfully obtained in any one of the evaluation results. The evaluation test 3 was carried out with the obtained water base ink for ink-jet recording 7 in the same manner as in Example 1. The blur was slightly conspicuous and it was impossible to obtain any sufficiently satisfactory printing quality. The evaluation test 4 was carried out with the obtained water base ink for ink-jet recording 7 in the same manner as in Example 1. The recorded image was washed away to such an extent that it was impossible to read the letters as a result of the immersion in tap water.

Table 1 shows the results of evaluation of the water base inks for ink-jet recording 1 to 3 prepared in Examples 1 to 3 and the water base inks for ink-jet recording 4 to 7 prepared in Comparative Examples 1 to 4. In Table 1, the symbol "+" indicates the good result, the symbol "±" indicates the partially defective result, and the symbol "−" indicates the defective result.

TABLE 1

|  | Ex. 1 | Ex. 2 | Ex. 3 | Comp. Ex. 1 | Comp. Ex. 2 | Comp. Ex. 3 | Comp. Ex. 4 |
| --- | --- | --- | --- | --- | --- | --- | --- |
| Surface tension (mN/m) | 36.8 | 30.7 | 46.0 | 55.9 | 31.5 | 26.3 | 37.5 |
| Advancing contact angle θa (°) | 75 | 69 | 78 | 105 | 72 | 56 | 73 |
| Receding contact angle θr (°) | 66 | 57 | 61 | 95 | 49 | 39 | 61 |
| θa−θr (°) | 9 | 12 | 17 | 10 | 23 | 17 | 12 |
| Jetting stability | + | + | + | − | ± | ± | + |
| Restoration performance | + | + | + | not tested | − | + | + |
| Printing quality | + | + | + | not tested | ± | − | ± |
| Water resistance | + | + | + | not tested | + | + | − |

According to Table 1, the water base inks for ink-jet recording 1 to 3 prepared in Examples 1 to 3 can be jetted stably, in which it is possible to form the sharp recorded image with less blur and it is possible to obtain the recorded image that is excellent in water resistance. On the other hand, any one of the results of the evaluation tests 1 to 4 was defective in the case of the water base inks for ink-jet recording 4 to 7 prepared in Comparative Examples 1 to 4.

The water base ink for ink-jet recording of the present invention can be stably jetted when the water base ink for ink-jet recording is used for the ink-jet recording method in which the water base ink for ink-jet recording is allowed to fly as minute liquid droplets from the recording head having a large number of pore nozzles to perform the recording. It is possible to provide the water base ink for ink-jet recording which makes it possible to form the sharp recorded image with less blur and which makes it possible to obtain the recorded image that is excellent in water resistance.

An embodiment of an ink jet printer as an ink-jet recording apparatus in accordance with the invention will be described as below with reference to the accompanying drawings.

Figure 5:
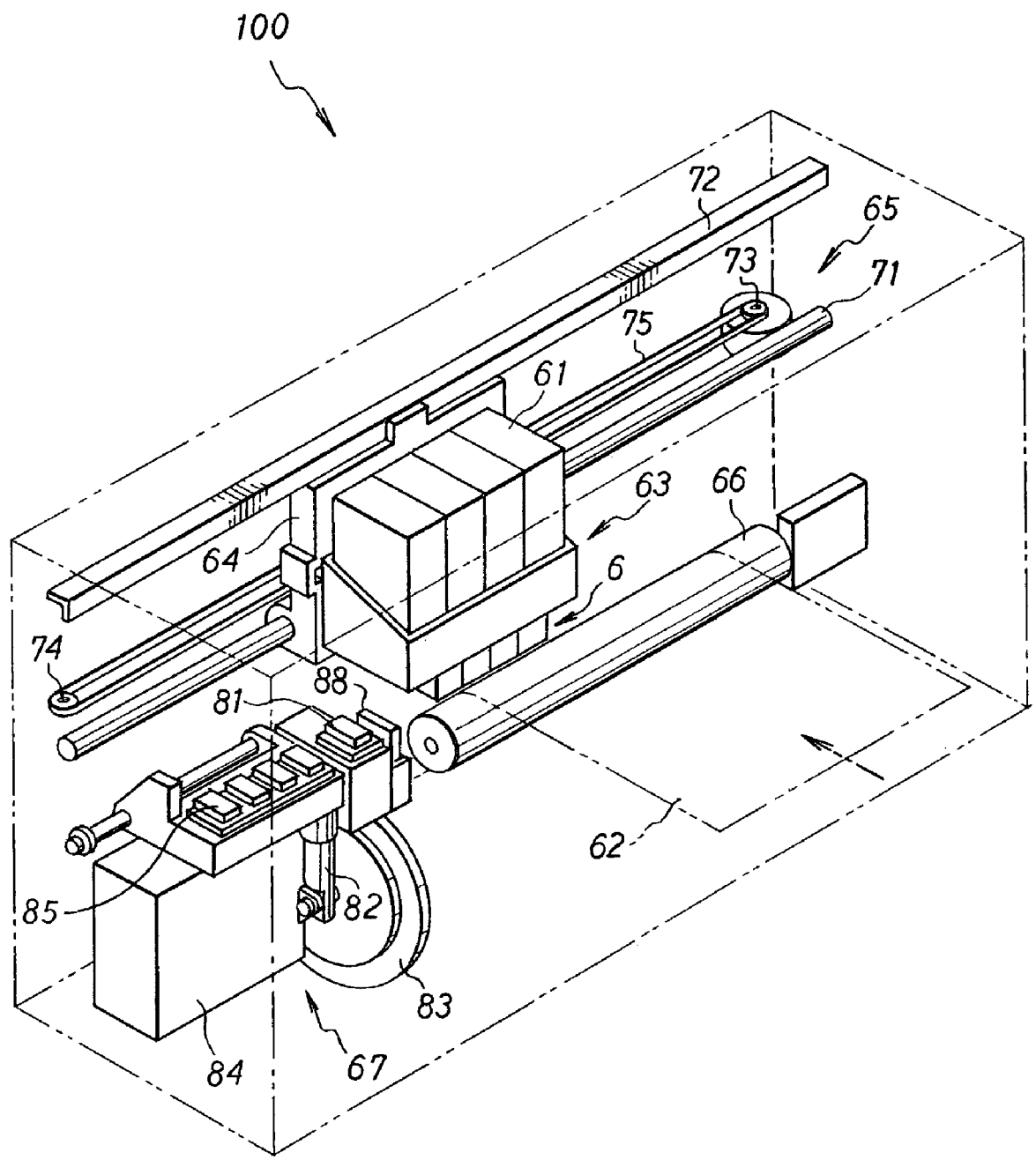
FIG. 5 is a perspective view showing a color ink-jet printer having an ink cartridge which contains ink prepared in examples of the invention.

As shown in FIG. 5, a color ink jet printer 100 includes four ink cartridges (ink set) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 5.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 6) in the head 6 mounted on the carriage 64 when it returns to the reset position after printing. The ink jet printer 100 is further provided with a wiper 88 adjacent to the purge cap 81. The wiper 88 wipes the nozzle surface to remove the ink on the surface.

Figure 6:
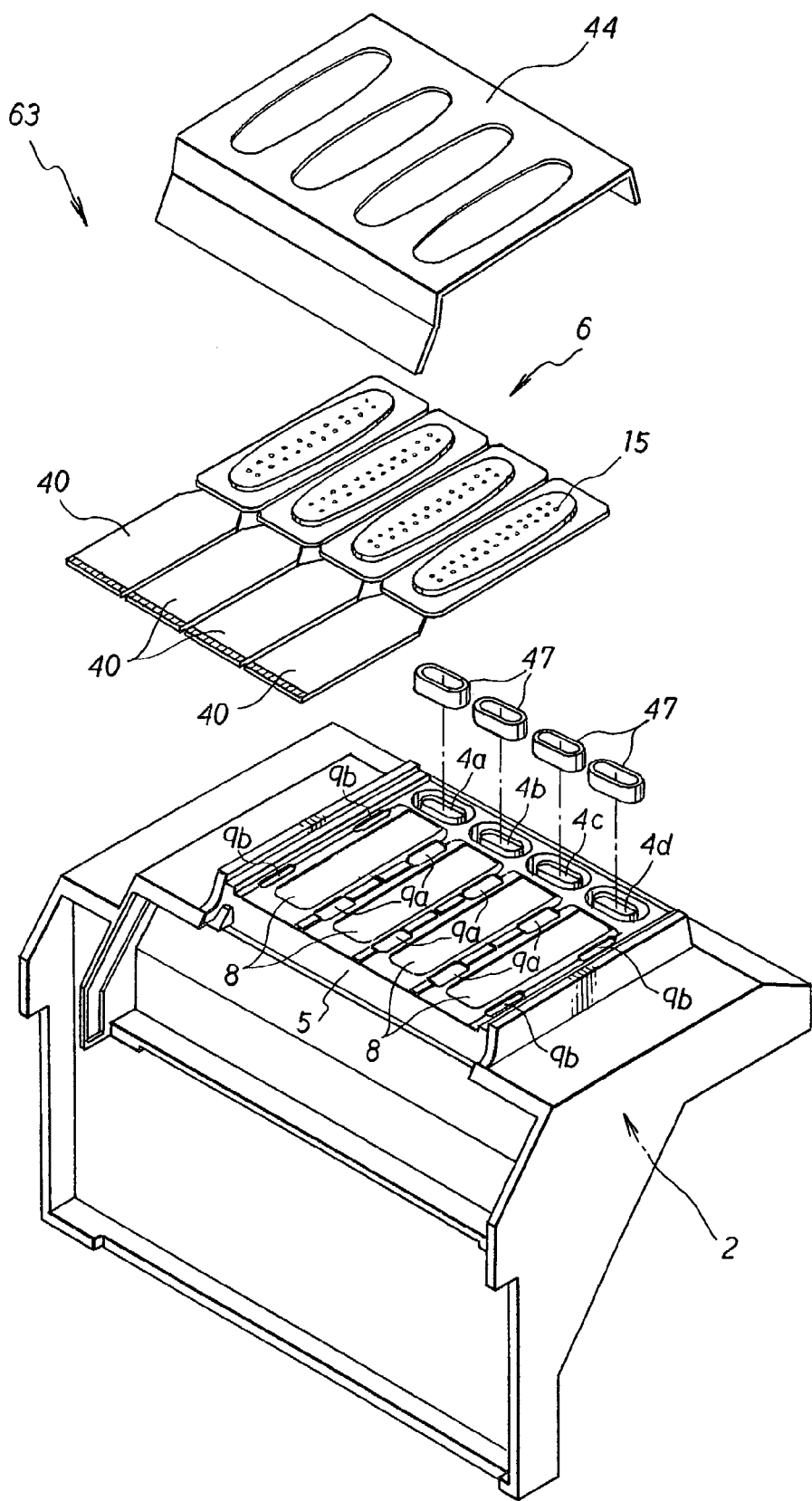
FIG. 6 is a perspective view of a head unit, with its nozzles facing upward.

As shown in FIG. 6, the head unit 63 is mounted on the carriage 64 that moves along the sheet 62 and has a substantially box shape with upper open structure. The head unit 63 has a cover plate 44 made of an elastic thin metallic plate. The cover plate 44 is fixed at the front surface of the head unit 63 and covers the head unit 63 when the head 6 is removed. The head unit 63 also has a mounting portion 2 on which the four ink cartridges 61 are detachably attached from above. Ink supply paths 4a, 4b, 4c, 4d, each of which connects respective ink discharge portions of each ink cartridge 61, communicate with a bottom of a bottom plate 5 of the head unit 63. Each of the ink supply paths 4a, 4b, 4c, 4d is provided with a rubber packing 47 to intimately contact an ink supply hole 19a.

The head 6 is constructed from four blocks that are arranged in parallel to each other. On the underside of the bottom plate 5, four stepped supports 8 are formed to receive the respective blocks of the head 6. In the bottom plate 5, a plurality of recesses 9a, 9b, which are filled with an UV adhesive to bond the respective blocks of the head 6, are formed to penetrate the bottom plate 5.

Figure 7:
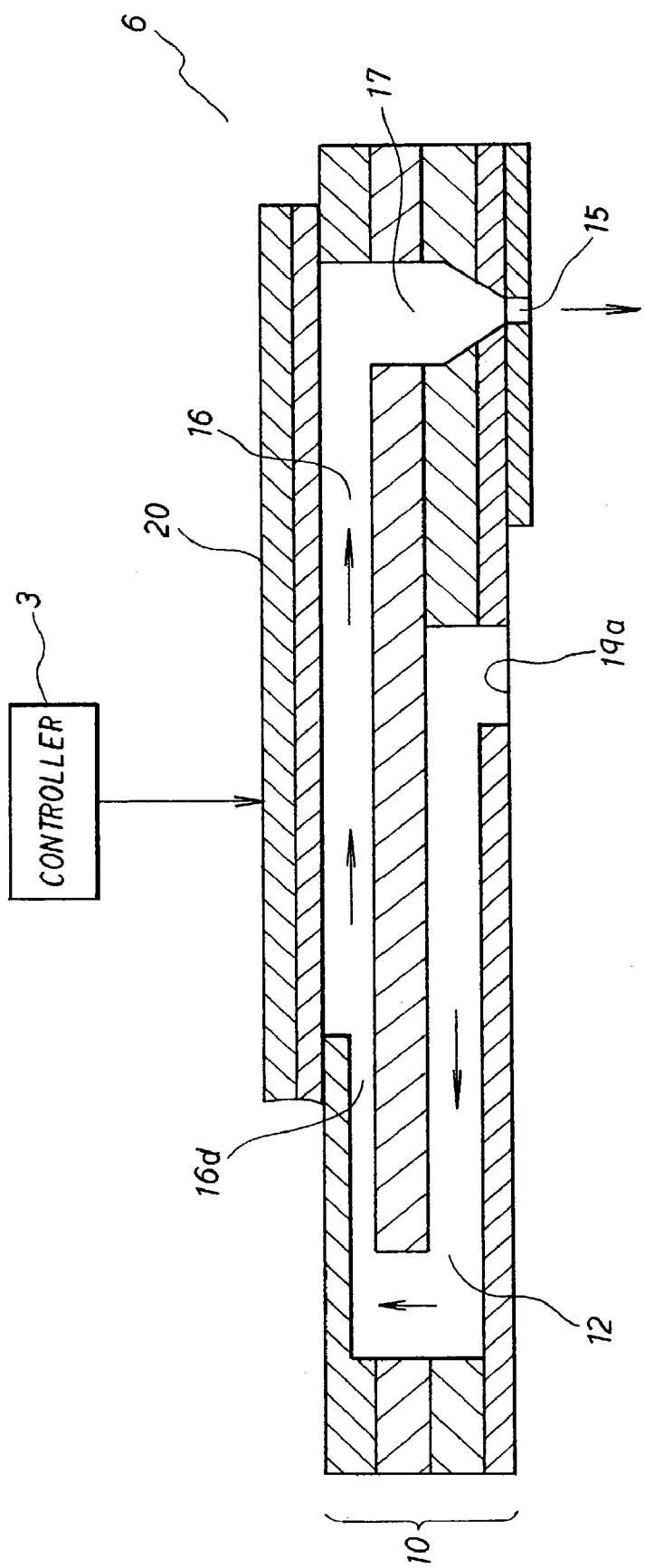
FIG. 7 is a schematic diagram showing the ink jet print head and a controller.

FIG. 7 is a sectional view showing one of the pressure chambers in the head 6. A plurality of pressure chambers 16 are provided in the head 6. The nozzles 15 communicating the respective pressure chambers 16 are provided substantially in line in one surface of the head 6.

As shown in FIG. 7, the head 6 is constructed by the cavity plate 10 comprised of a plurality of thin metal plates which are formed of nickel or nickel alloy and the piezoelectric actuator 20. The cavity plate 10 has the ink supply holes 19a connected with the ink cartridge 61, the manifolds 12, the narrowed portions 16d, the pressure chambers 16, the through holes 17 and the nozzles 15, which communicate with each other. While the ink supply hole 19a opens toward the ejecting direction of the nozzle 15 in FIG. 7 for convenience, the ink supply hole 19a actually opens toward the piezoelectric actuator 20.

A controller 3 provides a prestored driving pulse to the piezoelectric actuator 20 by superimposing the driving pulse on a clock signal. The driving pulse can be controlled with a technique disclosed in, for example, U.S. Pat. Nos. 6,312,089, 6,412,923 B1 and 6,760,959. Further, the detailed structure of the printer and controlling method of the head unit are also disclosed in these U.S. patents, a content of which has been incorporated herein by reference.

What is claimed is:

1. A water base ink for ink-jet recording comprising:
water;
and a self-dispersing type coloring agent, wherein:
a surface tension of the ink is 30 to 50 mN/m; and
an advancing contact angle is not less than 65°, a receding contact angle is not less than 55°, and a difference between the advancing contact angle and the receding contact angle is not more than 20° when a droplet of the ink is placed on a polyimide resin base plate on which an FEP resin film is formed,
wherein types and blending amounts of the ink components are adjusted to control the advancing and receding contact angles and the difference between the advancing and receding contact angles.

2. The water base ink for ink-jet recording according to claim 1, further comprising a water-soluble organic solvent.

3. The water base ink for ink-jet recording according to claim 2, further comprising a surfactant.

4. The water base ink for ink-jet recording according to claim 1, wherein the self-dispersing type coloring agent is contained by 1 to 10% by weight in the ink.

5. The water base ink for ink-jet recording according to claim 1, wherein the water is contained by not less than 40% by weight in the ink.

6. The water base ink for ink-jet recording according to claim 1, wherein the self-dispersing type coloring agent includes a self-dispersing type carbon black dispersion.

7. An ink-jet recording apparatus comprising:
an ink-jet head which has a surface on which a nozzle for jetting an ink is formed; and
an ink tank which accommodates the ink, wherein:
the ink comprises water and a self-dispersing type coloring agent, and a surface tension of the ink is 30 to 50 mN/m; and
an advancing contact angle is not less than 65°, a receding contact angle is not less than 55°, and a difference between the advancing contact angle and the receding contact angle is not more than 20° when a droplet of the ink is placed on the surface of the ink-jet head,
wherein types and blending amounts of the ink components are adjusted to control the advancing and receding contact angles and the difference between the advancing and receding contact angles.

8. The ink-jet recording apparatus according to claim 7, wherein a water-repellent film is formed on the surface of the ink-jet head.

9. The ink-jet recording apparatus according to claim 7, wherein the surface of the ink-jet head is formed of a polyimide resin base plate on which an FEP resin film is formed.

10. The ink-jet recording apparatus according to claim 7, wherein the ink tank is in a form of replaceable ink cartridge.

11. The ink-jet recording apparatus according to claim 7, further comprising a purge unit which purges the nozzle of the ink-jet head.

12. The ink-jet recording apparatus according to claim 7, further comprising a wiper which wipes the surface of the ink-jet head.

13. The ink-jet recording apparatus according to claim 7, wherein the ink further comprises a water-soluble organic solvent.

14. The ink-jet recording apparatus according to claim 10, wherein the ink further comprises a surfactant.

15. The ink-jet recording apparatus according to claim 7, wherein the self-dispersing type coloring agent is contained by 1 to 10% by weight in the ink.

16. The ink-jet recording apparatus according to claim 7, wherein the water is contained by not less than 40% by weight in the ink.

17. The ink-jet recording apparatus according to claim 7, wherein the self-dispersing type coloring agent includes a self-dispersing type carbon black dispersion.

* * * * *